May 21, 1957 G. M. WALRAVEN ET AL 2,792,733
PRE-SET TORQUE INDICATING WRENCH
Filed June 22, 1955 2 Sheets-Sheet 1
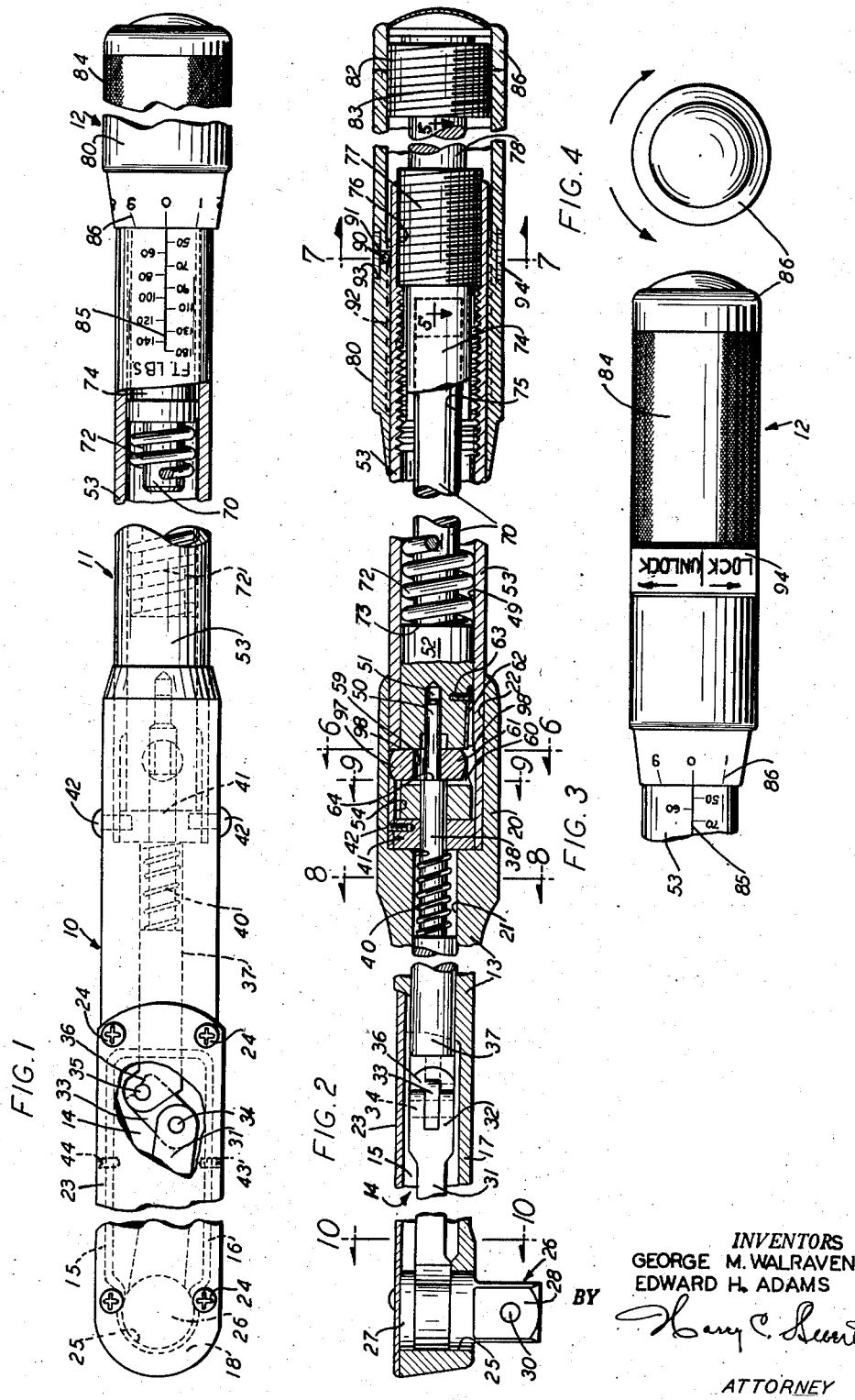
INVENTORS
GEORGE M. WALRAVEN
EDWARD H. ADAMS
BY
ATTORNEY

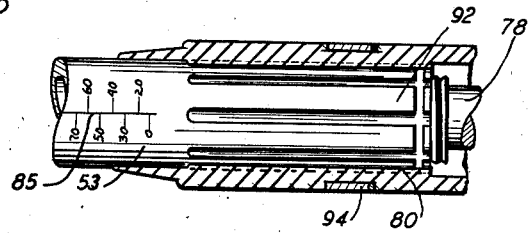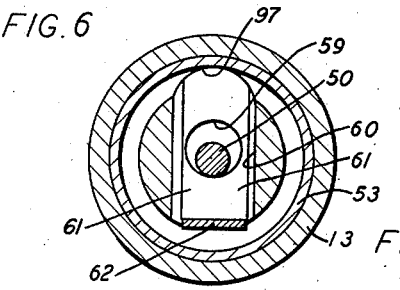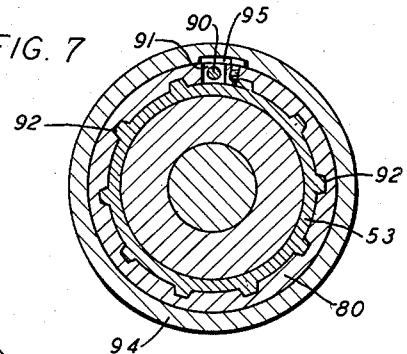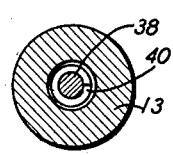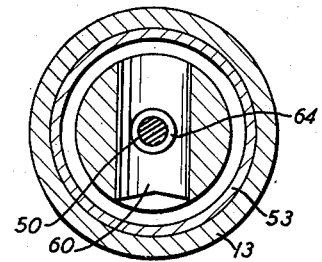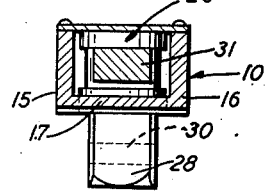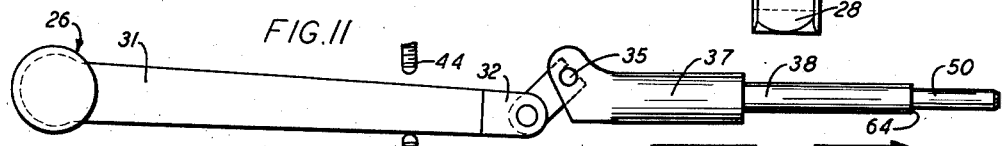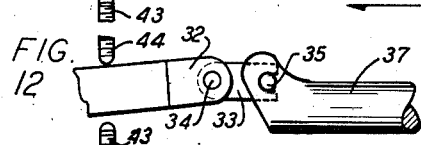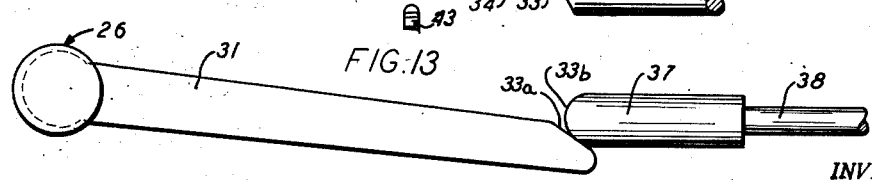

United States Patent Office 2,792,733
Patented May 21, 1957

2,792,733
PRE-SET TORQUE INDICATING WRENCH

George M. Walraven and Edward H. Adams, Kenosha, Wis., assignors to Snap-On Tools Corporation, Kenosha, Wis., a corporation of Delaware Application June 22, 1955, Serial No. 517,164

11 Claims. (Cl. 81—52.4)

The present invention relates to turning devices and more particularly to torque measuring and indicating wrenches of the general type shown and described in United States Patents Nos. 2,312,104, 2,367,224 and 2,682,796 dated February 23, 1943, January 16, 1945 and July 6, 1954 respectively, although certain features of the invention may be employed with advantage for other purposes.

Most present day torque wrenches operate either upon the principle of measuring the flex in a beam which resists the manual turning force utilized in nut turning and similar operations, or, as in the case of the structures shown in the above mentioned patents, of measuring the degree of twist deformation in a shank or shaft as the measuring expedient for such operations. The torque wrench comprising the present invention differs from such present day devices in that neither bending nor torsional stresses are relied upon for the creation of measurable displacements and, instead, the application of torque to the actual turning member which transmits the torque to the nut or other element undergoing tightening is translated through a train of movable members, none of which are suscepible to deformation, and the pressure thus obtained is applied to the compression of a spring which may be preloaded in a predetermined manner to attain the desired torque characteristics for which the wrench may be set. The advantages of such a principle of operation are numerous and, principal among these, is the construction of a torque wrench which possesses linear characteristics and which may therefore be calibrated conveniently and linearly.

Another advantage of the present torque wrench is that since reliance for torque measurements is not placed upon the bending or torsional deformation of a member which is one of the principal elements of the device, but rather is placed upon the compression of a preloaded spring, the latter may, if necessary, be replaced with convenience and at a comparatively low cost. A similar and related advantage of the present torque wrench resides in the fact that the deformable spring which is used for sensing the applied torque load is far less likely to lost its resilience inasmuch as it is not, even under the maximum application of torque for which the tool may be set, subject to the high pressures involved with conventional wrenches which utilize either bending or twisting deformation of a member to sense the applied torque.

The attainment of each of the above noted advantages of the present torque wrench may be regarded as an object of this invention and an additional object thereof is the provision of a wrench of this character wherein the application of torque from the actual torque applying element of the wrench through the train of mechanism employed to sense the amount of the applied torque is relatively evenly distributed so that no one particular element is placed under high stress and the ultimate pressure applied to the yieldable element or spring is relatively low thus further contributing toward the maintenance of linear torque characteristics throughout the range of adjustment of the device.

It has been found in actual use that operators of torque wrenches which embody the usual dial indicators for measuring and indicating the degree of applied torque may not be too observant of the indicator dial or they may work in positions of difficulty or strain and in such inaccessible places that there is little opportunity to read the indicator dial which, in fact, at times may be totally obscured from vision. Furthermore, reliance upon the accurate reading of indicator dials and the like under any circumstances is open to human error. For these reasons, torque wrenches which rely solely upon the reading of a dial or other indicator of the applied torque have not been entirely dependable. The present invention is designed to overcome the above-noted limitations that are attendant upon torque wrenches having visual indicating means for disclosing the degree of applied torque and, toward this end, it contemplates the provision of a wrench in which the usual dial indicator mechanism has been completely eliminated and in its stead there has been substituted the provision of an audible signal which, at the proper time, becomes effective to transmit to the operator the knowledge that the predetermined degree of manual torque for which the instrument has been set has been attained.

The provision of a novel means for producing such an audible signal when the desired torque level has been attainer being among the more important objects of the invention, another object is to provide such a means in which the volume of the audible signal, as well as its tonal characteristics, will vary according to the torque level for which the device is set.

Yet another object of the invention, in a torque wrench of this character, is the provision of a novel form of release mechanism which, at the time the desired torque level has been attained and at the time of sounding of the audible signal, momentarily relieves the nut or other element undergoing tightening of all torque so that the operator of the wrench senses a slight "slippage," so to speak, of the operating handle accompanied by a jar at the termination of such slippage, thus further rendering a sensory perception that the desired torque level has been attained.

The provision of a torque wrench which is extremely compact in its design and which therefore consumes a minimum amount of space, one which is of lightweight construction yet rugged and durable and which therefore may be put to hard usage; one which is comprised of a minimum number of moving parts and which therefore is unlikely to get out of order; one in which none of the component parts thereof is of intricate design and which may consequently be manufactured at a low cost; and one which otherwise is well adapted to perform the services required of it are further desirable features that have been borne in mind in the production and development of the present invention.

Numerous other objects and advantages of the invention not at this time enumerated will become more readily apparent as the nature of the invention is better understood.

In the accompanying two sheets of drawings forming a part of this specification a preferred embodiment of the invention has been shown.

In these drawings:

Fig. 1 is a fragmentary plan view, partly in section, of a torque wrench constructed in accordance with the principles of the present invention.

Fig. 2 is a sectional view taken substantially centrally and longitudinally through the structure of Fig. 1.

Fig. 3 is an enlarged fragmentary view of a portion of the structure shown in Fig. 1.

Fig. 4 is an end view of the structure shown in Fig. 3.

Fig. 5 is a sectional view taken substantially along the line 5—5 of Fig 2 with certain parts being shown in elevation.

Fig. 6 is an enlarged sectional view taken substantially along the line 6—6 of Fig. 2.

Fig. 7 is an enlarged sectional view taken substantially along the line 7—7 of Fig. 2.

Fig. 8 is a sectional view taken substantially along the line 8—8 of Fig. 2.

Fig. 9 is a sectional view taken substantially along the line 9—9 of Fig. 2.

Fig. 10 is a sectional view taken substantially along the line 10—10 of Fig. 2.

Fig. 11 is a fragmentary side elevational detail view, somewhat schematic in its representation illustrating the operation of certain torque responsive linkage mechanism capable of being employed in connection with the present invention.

Fig. 12 is a fragmentary view similar to Fig. 11 showing the parts in a different position, and Fig. 13 is a fragmentary view similar to Fig. 11 showing a modified form of linkage mechanism capable of being employed in connection with the present invention.

The structure selected for illustration is not intended to serve as a limitation upon the scope or teachings of the invention, but is merely illustrative thereof. There may be considerable variations and adaptations of all or part of the teachings of the invention depending upon the dictates of commercial practice.

The improved torque wrench herein illustrated involves in its general organization a body portion 10 and a handle portion 11, the latter including a handle grip proper 12. The body portion 10 serves to enclose certain torque responsive linkage mechanism while the handle portion 11 encloses a spring pressed trigger operated hammer mechanism. The grip portion 12 operatively contains certain preloading mechanism whereby the tension of the spring pressed hammer mechanism may be selectively varied to accommodate the requirements of the torque wrench in actual use, all in a manner that will be described presently.

The body portion of the wrench includes a casing or body 13 which may be cast or otherwise formed to provide an elongated upwardly opening shallow chamber 14 having side walls 15 and 16 and a bottom wall 17 and terminating in a semi-circular head extremity 18. The body 13 at the end remote from the head extremity 18 is formed with a tubular extension 20 providing a bore 21 and an enlarged counterbore 22 therethrough. A flat cover plate 23 closes the upper open end of the chamber 14 and is removably secured in position by means of fastening screws 24.

The semi-circular head portion 18 of the casing body 13 is formed with a circular opening 25 through which there projects a cylindrical torque applying body or turning member 26 capable of free limited turning movement within the opening 25. The member 26 is formed with an internal cylindrical portion 27 which is partially encompassed by the surrounding curved wall of the end region of the chamber 14 and the portion of the member 26 exteriorly of the body 13 may be squared as at 28 or may otherwise be polygonal and constitutes a wrench socket receiving extremity. The usual spring detent 30 is provided in one face of the polygonal extremity for cooperation with a suitable recess provided in the wrench socket or other turning device which may be telescoped thereon for retention against accidental displacement.

Integrally formed on the turning member 26 is a radially displaceable rod or beam 31 the free end of which is bifurcated as at 32 for pivotal connection to a toggle member 33 by means of a pin 34. The free end of the toggle member 33 bears against a pin 35 which straddles the bifurcated end 36 of a plunger 37 which is slidable in the bore 21 and which is formed with a reduced portion 38 projecting into and partially through the counterbore 22. The plunger 37 is normally urged toward a forward or extended position by means of a spring 40 encircling the reduced portion 38 and bearing at one end against an anvil member 41 secured in the end of the counterbore 22 by means of screws 42 and surrounding the reduced portion 38 of the portion 37.

Normally, the spring 40, acting through the plunger 37 and toggle member 33, serves to maintain the beam 31 in the position shown in Fig. 11 wherein the side thereof bears against a set screw 43 which is employed initially for taking up any slack in the linkage system just described. Application of countertorque to the turning member 26 however will displace the beam 31 and ultimately bring the same into contact with a second set screw 44, at which time the toggle member moves into substantial alignment with the axial direction of the wrench body so that the plunger 37 will be forced rearwardly to a fully retracted position for purposes that will be described subsequently.

The extreme rear end of the plunger 37 is formed with a reduced stem portion 50 which projects into a relatively deep socket 51 formed in a hammer member 52. The hammer member 52 is slidably disposed in the central bore 49 of a tubular casing 53 which forms one element of the handle assembly 11. The forward end of the casing 53 projects into the counterbore 22 of the tubular extension 20 and is anchored therein by means of the fastening screws 42. The casing 53 is formed with a slightly enlarged counterbore 54 which contains the impact member 41 and into which the forward end of the hammer member 52 extends.

As best illustrated in Figs. 2, 6 and 9, the hammer member 52 is formed with a transverse slot 60 in which there is loosely disposed a trigger member 61, the latter being in the form of a ring having a central opening somewhat larger in diameter than the diameter of the piston stem 50 which it surrounds. The trigger member is normally urged toward an offset position as shown in Fig. 2 by means of a leaf spring 62 fastened at 63 to a side of the piston member 52. The trigger member 61 is thus adapted to normally bear against the shoulder 64 existing at the forward end of the stem 50 so that it may receive the thrust exerted by the plunger 37 when the latter is forced rearwardly under the influence of torque applied to the beam 31.

The hammer 52 is formed with a reduced rearwardly extending stem portion 70 and a relatively heavy coil spring 72 surrounds the stem portion 70 and bears at one end against the shoulder 73 existing at the forward end of the stem portion and at its other end against the forward end of a load tube 74 which is slidably and adjustably mounted in the rear portion of the casing 53. The end of the stem portion 70 of the hammer 52 extends into the bore 75 of the load tube 74 and is thus piloted therein.

The spring 72 is adapted to be preloaded between the end of the load tube and the enlarged portion of the hammer 52 so that varying degrees of thrust will be applied to the hammer when the predetermined degree of torque for which the wrench has been set is attained. Toward this end, the longitudinal setting of the load tube 74 may be adjusted toward and away from the anvil member 41 and, to accomplish this adjustment, the rear end of the tubular casing 53 is internally threaded as at 76 and makes threaded engagement with an enlarged threaded region 77 formed at the forward end of a load screw 78 against which the rear end of the load tube 74 is adapted to bear. The load screw is adapted to be manually turned to effect the desired torque setting by means of the handle grip 12 which includes an outer sleeve 80 rotatably mounted on the rear end of the casing 53 and adjustably connected by means of a threaded connection 82 to a second enlarged threaded portion 83 provided on the load screw 78. The exterior of a portion of the sleeve 80 may be knurled as at 84 to facilitate manual turning thereof and the setting of the sleeve may be accurately made by reference to a conventional vernier scale 85 stamped or otherwise marked on the outside of the casing 53 together with cooperating indicia 86 provided on the sleeve 80 near the rim thereof. Initial calibration of the wrench for proper setting of the vernier adjustment may be made by turning the load screw relative to the sleeve 80 while measuring the applied torque utilizing a conventional torque tester. When the correct reading of the vernier scale has been attained the sleeve and load screw may be locked in position by means of a cap nut 86.

The sleeve 80 may be locked in any desired position of torque adjustment by means of a clutch arrangement including a locking member in the form of a ball 90 disposed in a slot 91 (Figs. 2 and 7) formed in the wall of the sleeve 80 and designed for selective register with the interstices existing between a series of longitudinally formed splines 92 provided on the outer surface of the casing 53. The sleeve 80 is circumferentially grooved as at 93 and a locking ring 94 (Figs. 2, 3 and 7) seats within the groove and normally confines the ball but is provided with an internal recess 95 (Fig. 7) which affords a clearance space for the ball so that the latter may, when the ring is turned in an unlocking direction as indicated by the legending of Fig. 3, move into register with the slot 91 and allow the ball to move radially outwardly and clear the splines 92 so that turning movement of the sleeve 80 is rendered possible.

In the operation of the torque wrench, the load spring 72 is preloaded in the manner previously described by manipulating the locking ring 94 to release the sleeve 80 of the handle grip portion 13 and, after the desired torque setting has been effected the ring 94 is turned to confine the locking ball 90 within one of the interstices existing between the splines. During application of the wrench to the element to be tightened, countertorque applied to the polygonal shank 28 of the turning member 26 will displace the beam 31 in a counterclockwise direction as seen in Fig. 1 and the toggle member 33, acting in the manner of a link, will, by a wedging action, impart a longitudinal component of thrust to the plunger 37 against the action of the spring 40 and the shoulder 64 on the reduced portion 38 will force the trigger member 61 rearwardly within the casing 53. It is to be noted that the trigger member 61 is formed with a rounded surface 97 as seen in Figs. 2 and 6 while the shoulder 98 existing between the bore 49 and counterbore 54 is also rounded so that as the trigger member is forced rearwardly within the casing 53, the rounded portion of the trigger member moves with a camming action over the shoulder and becomes substantially centered within the sleeve 53 so that the bore 59 becomes aligned with the reduced portion 38 of the plunger, thus releasing the trigger member and hammer, as a unit, and allowing the spring 72 to force the hammer 52 forwardly so that the forward end thereof will strike the anvil 41, which may be regarded as constituting a portion of the wrench body, and create an impact which not only is audible but which also is distinctly perceptible to the touch of the operator. The trigger member thus operates in the manner of a latch to hold the hammer in its retracted position and release of the trigger or latch member 61 and hammer will release the tension in the linkage system extending from the turning member 26 through the beam 31 and toggle member 33 to the plunger 37 so that a slight additional movement of the torque wrench bodily about the rotational axis of the turning member 26 is made possible, thus further indicating to the operator that the torque limit for which the wrench has been set has been attained.

In Fig. 13 a slightly modified form of linkage mechanism has been substituted for the linkage mechanism shown in Figs. 1, 2, 11 and 12. Here, instead of translating the oscillatory movement of the beam 31 into axial movement of the plunger 37 through the medium of the toggle member 33, the latter member has been eliminated and the free end of the beam 31 is formed with an inclined cam surface 33a. The forward end of the plunger 37 is rounded as at 33b to provide a cooperating cam surface designed for camming engagement with the surface 33a when countertorque is encountered by the turning member 26. Otherwise the operation of the torque wrench is in no manner altered.

While there has been illustrated and described a preferred embodiment of the invention, it must be understood that the invention is capable of considerable modification without departing from the spirit of the invention. The invention therefore is not to be limited to the precise details of construction set forth and such variations and modifications as come within the scope of the appended claims may be taken advantage of if desired.

What is claimed is:

1. In a torque wrench of the character described, in combination, an elongated rigid body member having a tubular handle portion extending rearwardly therefrom, a torque applying work-engaging member turnably mounted at the forward end of said body member, a beam secured at one end to said work-engaging member and movable bodily therewith, a plunger slidable in said body member and movable between a retracted position wherein it is in close proximity to the free end of said beam to an advanced position wherein it is remote from said free end of the beam, means normally urging said plunger toward its retracted position, means extending between the free end of the beam and plunger for translating turning movement of said beam in response to the application of countertorque to said work-engaging member into sliding movement of said plunger whereby the latter is moved toward its advanced position, a hammer member slidable in said body member and movable from a retracted position to an advanced position wherein it effectively engages a portion of said body member to create an impact therewith, spring means normally urging said hammer member toward its advanced position, cooperating releasable latch means on said plunger and hammer member normally constraining said hammer member to follow the advancing movements of the plunger and thereby move toward its retracted position, and automatically operable means for releasing said latch means when said plunger attains its fully retracted position.

2. In a torque wrench of the character described, the combination set forth in claim 1 wherein said movement-translating means is in the form of a toggle link the opposite ends of which engage the free end of the beam and said plunger and translate turning movement of the beam into sliding movement of the plunger by a wedging action.

3. In a torque wrench of the character described, the combination set forth in claim 1 wherein said movement-translating means is in the form of a toggle link having one end pivotally connected to the free end of the beam, and a pin mounted on said plunger, the other end of said link engaging said pin for rocking movement about the axis thereof.

4. In a torque wrench of the character described, in combination, an elongated rigid body member having a tubular handle portion extending rearwardly therefrom, a torque applying work-engaging member turnably mounted at the forward end of said body member, a beam secured at one end to said work-engaging member and movable bodily therewith, a plunger slidable in said body member and movable between a retracted position wherein it is in close proximity to the free end of said beam to an advanced position wherein it is remote from said free end of the beam, means normally urging said plunger toward its retracted position, means extending between the free end of the beam and plunger for translating turning movement of the beam in response to the application of countertorque to said work-engaging member into sliding movement of said plunger whereby the latter is moved toward its advanced position, a hammer member slidable in said body member and movable from a retracted position to an advanced position wherein it effectively engages a portion of said body member to create an impact therewith, spring means disposed in said handle portion and engageable with the hammer member and normally urging the latter toward its advanced position, cooperating releasable latch means on said plunger and hammer member normally constraining said hammer member to follow the advancing movements of the plunger and thereby move toward its retracted position, and means on said handle member and engageable with said latch means to trip the same when said plunger attains its fully retracted position.

5. In a torque wrench of the character described, the combination set forth in claim 4 wherein said latch means comprises a shoulder on said plunger, a shoulder on said hammer member, a displaceable trigger member movable from a latching position wherein it is effectively interposed between said shoulders to a position of release wherein it is out of engagement with one of said shoulders, means normally maintaining said trigger member in its latching position.

6. In a torque wrench of the character described, the combination set forth in claim 4 wherein said trigger member is movable out of engagement with the shoulder provided on the plunger member to effect release of said latch means.

7. In a torque wrench of the character described, in combination, an elongated rigid body member having a tubular handle portion extending rearwardly therefrom, a torque applying work-engaging member turnably mounted at the forward end of said body member, a beam secured at one end to said work-engaging member and movable bodily therewith, a plunger slidable in said body member and movable between a retracted position wherein it is in close proximity to the free end of said beam to an advanced position wherein it is remote from said free end of the beam, means normally urging said plunger toward its retracted position, means extending between the free end of the beam and plunger for translating turning movement of the beam in response to the application of countertorque to said work-engaging member into sliding movement of said plunger whereby the latter is moved toward its advanced position, a hammer member slidable in said body member and movable from a retracted position to an advanced position wherein it effectively engages a portion of said body member to create an impact therewith, spring means normally urging said hammer member toward its advanced position, cooperating releasable latch means on said plunger and hammer member normally constraining said hammer member to follow the advancing movements of the plunger and thereby move toward its retracted position, automatically operable means for releasing said latch means when said plunger attains its fully retracted position, and manually operable means carried by said handle portion for varying the effective strength of said spring means.

8. In a torque wrench of the character described, the combination set forth in claim 7 wherein said spring means comprises a coil spring disposed within the handle portion and bearing at one end against said plunger, and wherein said manually operable means comprises a load screw threadedly mounted in said handle and having an end thereof bearing against the other end of the coil spring, said load screw being axially adjustable in the handle upon manual turning thereof.

9. In a torque wrench of the character described, in combination, an elongated rigid body member having a tubular handle portion extending rearwardly therefrom, a torque applying work-engaging member turnably mounted at the forward end of said body member, a beam secured at one end to said work-engaging member and movable bodily therewith, a plunger slidable in said body member and movable between a retracted position wherein it is in close proximity to the free end of said beam to an advanced position wherein it is remote from said free end of the beam, means normally urging said plunger toward its retracted position, means extending between the free end of the beam and plunger for translating turning movement of the beam in response to the application of countertorque to said work-engaging member into sliding movement of said plunger whereby the latter is moved toward its advanced position, a hammer member slidable in said body member and movable from a retracted position to an advanced position wherein it effectively engages a portion of said body member to create an impact therewith, a load screw threadedly received within said handle portion and adjustable axially therealong upon turning movement of the same, a coil spring disposed within the handle and bearing at one end against the load screw and at the other end against said hammer member and serving to normally urge the latter to its advanced position, a handle grip telescopically received over said handle portion and rotatable thereon, and means for securing said handle grip to said load screw for movement bodily therewith.

10. In a torque wrench of the character described, the combination set forth in claim 9 including releasable clutch means disposed between the handle grip and handle portion for locking said handle grip, and consequently the load screw, in a fixed position relative to the handle portion.

11. In a torque wrench of the character described, the combination set forth in claim 9 wherein said securing means for said handle grip comprises interengaging threads on the handle grip and load screw whereby the former is adjustable axially relative to the latter, and a locking nut threadedly received on the load screw and engageable with the handle grip for locking the latter in a selected position of adjustment on the load screw.

References Cited in the file of this patent

UNITED STATES PATENTS

| | | |
|---|---|---|
| 1,572,046 | Seiler | Feb. 9, 1926 |
| 2,300,652 | Cooney | Nov. 3, 1942 |
| 2,365,486 | Morris | Dec. 19, 1944 |
| 2,400,205 | Livermont | May 14, 1946 |
| 2,667,800 | Garwood | Feb. 2, 1954 |
| 2,679,777 | Muth | June 1, 1954 |
| 2,686,446 | Livermont | Aug. 17, 1954 |

FOREIGN PATENTS

| | | |
|---|---|---|
| 574,346 | Great Britain | Jan. 1, 1946 |